May 23, 1944.  G. E. DANIELS  2,349,576
SCRAPING APPARATUS
Filed Oct. 8, 1942  6 Sheets-Sheet 1

INVENTOR.
GORDON E. DANIELS
BY
ATTORNEY.

May 23, 1944.   G. E. DANIELS   2,349,576
SCRAPING APPARATUS
Filed Oct. 8, 1942   6 Sheets-Sheet 3

FIG.3.

INVENTOR.
GORDON E. DANIELS
BY
ATTORNEY.

May 23, 1944. G. E. DANIELS 2,349,576
SCRAPING APPARATUS
Filed Oct. 8, 1942 6 Sheets-Sheet 4

FIG.4.

INVENTOR.
GORDON E. DANIELS
BY
*Fred N. Schwend*
ATTORNEY.

FIG_6_

FIG_7_

FIG_8_

Patented May 23, 1944

2,349,576

UNITED STATES PATENT OFFICE 2,349,576

SCRAPING APPARATUS

Gordon E. Daniels, Nashville, Tenn.

Application October 8, 1942, Serial No. 461,270

17 Claims. (Cl. 37—126)

The invention relates to dirt scraping apparatus wherein a dirt accumulating body having a scraper blade associated therewith, is dragged over the ground to be scraped, the forward movement of the body effecting movement of the scraped dirt or other material upwardly into the body. When the scraper has received a capacity load, or less as desired, it is raised to remove the scraper blade from contact with the ground and the body is then hauled to a point where it is desired to discharge the load.

An object of the present invention is to utilize the forward movement of a scraper to control proper adjustment of the operating parts thereof.

A further object is to automatically control opening of an apron or bowl during the different operations of the scraper.

A further object is to utilize the scraped material carried by the scraper to effect opening of the apron during dumping operation and to automatically control such opening action during loading.

A further object is to reduce resistance to the entrance of dirt into a scraper body during movement of the scraper over the ground.

The manner in which the above and other objects of the invention are accomplished will be readily understood on reference to the following specification when read in conjunction with the accompanying drawings wherein:

In the present machine, means are provided whereby a pull on the scraper by the usual draft means during a loading operation may be utilized to properly control the opening of the apron or forward bowl to permit an influx of scraped material over the scraper blade and at the same time to reduce loss of dirt due to movement thereof outwardly through the opening formed by the apron. This control is also influenced by the hoisting means for the scraper and by the operation of a rear bowl and has the particular advantage that it reduces the amount of attention required of the operator to properly control the scraper during operation. When the scraper body is raised to a dirt transporting position means controlled by the hoisting mechanism are utilized to effect the closing of the apron, while movement of the rear bowl to an unloading position controls certain mechanism to enable the dirt to force the forward apron open sufficiently to permit ejection of the scraped material.

Figure 1:
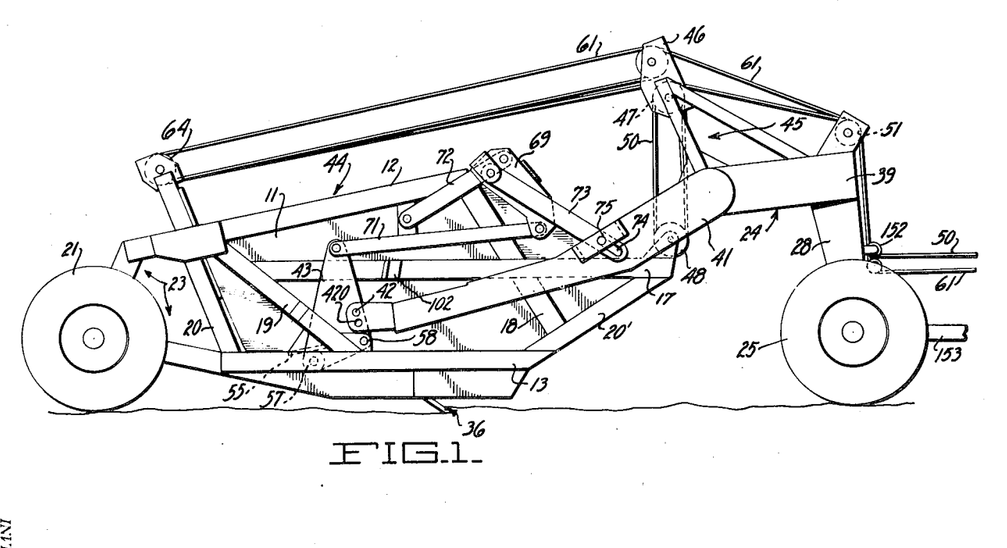
Fig. 1 is a side elevational view of a dirt scraper embodying the present invention and illustrating the same in loading position.
Figure 2:
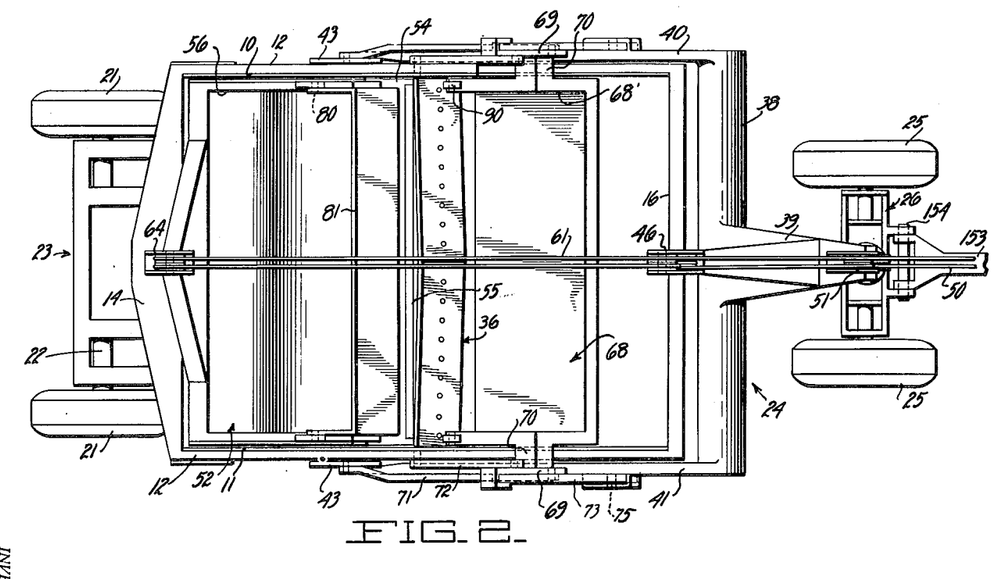
Fig. 2 is a plan view of the dirt scraper.
Figure 3:
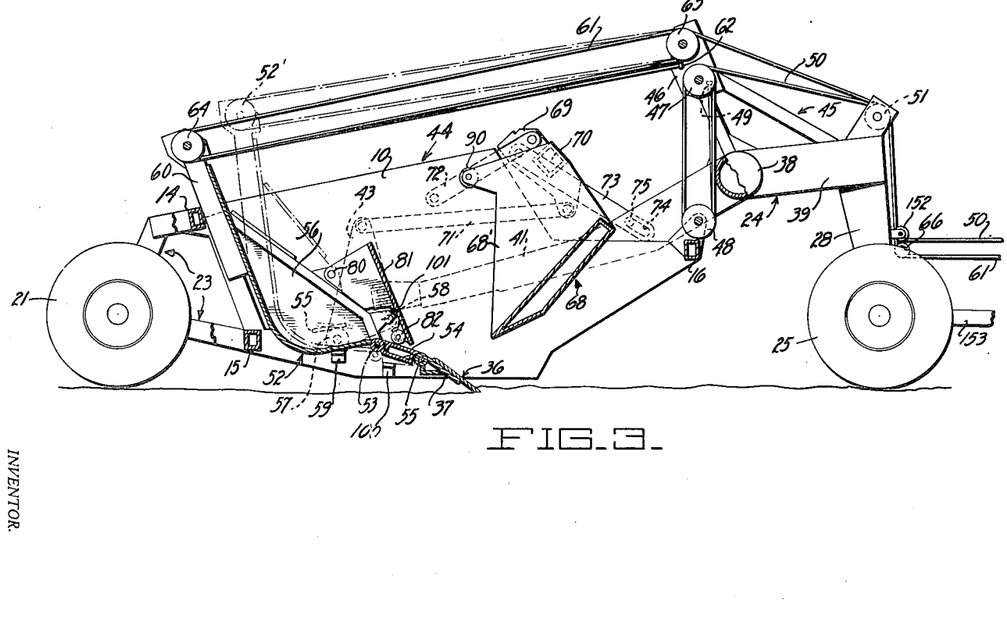
Fig. 3 is a longitudinal sectional view of the scraper illustrating the same in loading position.

Describing the scraper in detail, reference is had in particular to Figs. 1, 2, and 3 wherein the side walls 10 and 11 of the scraper body are secured along their upper edges to beams 12 and at their lower edges to beams 13. Other beams 17, 18, 19, 20 and 20' are provided to strengthen the side walls. The side walls are held in spaced relationship by transversely extending beams 14, 15, and 16 to form a main frame 44.

The rear of the scraper body formed by the above enumerated elements is supported by wheels 21, the axles 22 of which are supported by a bracket structure generally indicated at 23 extending from the main frame 44.

The forward end of the scraper is supported by a yoke frame generally indicated at 24 mounted on front wheels 25.

Means are provided to permit a certain amount of transverse rocking of the front wheels 25 and their axle, generally indicated at 26 (Fig. 6), relative to the yoke frame 24 so that the scraper may follow an uneven ground surface while preventing, within certain limits, bending strains on the wheels, axles, etc., and also preventing the wheels 25 from rubbing against the frame 24. A frustoconical member 27 is fixed to the bottom of a post 28 forming part of the yoke frame 24 and has a depending bearing stud 29 rigidly attached thereto and journaled in a bearing block 30. The block 30, in turn, is provided with trunnions indicated by the dot-and-dash lines 31 journaled in horizontal bearings provided in the axle unit 26.

Figure 6:
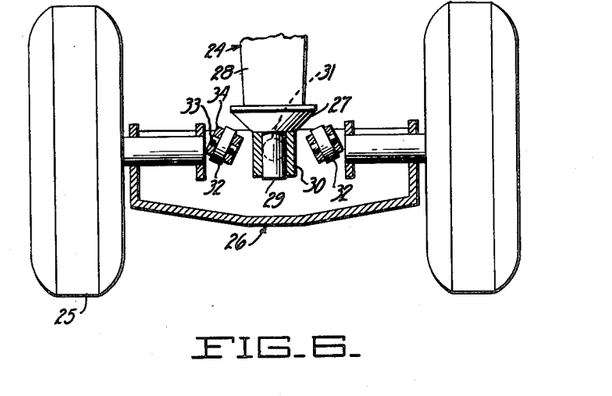
Fig. 6 is a front view, partly in section, of the truck assembly for supporting the forward end of the scraper.

A certain amount of transverse rocking movement about the trunnions 31 is permitted between the frame 24 and the axle 26, this movement being limited by a pair of rollers 32 located on opposite sides of the bearing block 30 and journaled on pins 33 mounted in bearings 34 which are integral with the sides of the axle unit 26. Thus, when, upon movement of the scraper over uneven ground surface, the axle 26 or the scraper body is rocked about the axes of the trunnions 31 a certain amount, one or the other of the rollers 32 will engage the conical surface of the member 27 and will prevent further relative rocking between the scraper body and the axle 26. The rollers 32, however, will permit steering of the axle 26 about the bearing stud 29 even when it is in an extremely transverse rocked position. The pins 33 are located with their axes extending substantially parallel with the engaging surface of the conical member 27 when said member is rocked so that the peripheries of the rollers may directly engage the surface of the member. It will be noted that the arrangement of the conical member 27 and rollers 32 in the manner disclosed results in a limiting means of rigid construction and yet of a minimum amount of material and a compact structure. The above described limiting means is disclosed and claimed in my copending application Serial Number 455,999, filed August 25, 1942.

A tongue 153 (Fig. 2) is connected by pivot rod 154 to the axle 26 and forms a link or draft member for transmitting movement from a tractor or the like to the scraper.

A scraper blade unit, generally indicated at 36 (Figs. 1, 2, 3, 7 and 8), comprising the scraping edge, is supported by a bracket 37 in a manner to be described in detail hereinafter. The bracket 37 is suitably secured to the side walls 10 and 11 at its ends and supports the blade unit 36 in a position extending below the remainder of the scraper body so as to engage the surface of the ground being scraped when the scraper is adjusted into a position similar to that illustrated at Figs. 1 and 3.

Means are provided for raising and lowering the scraper body to move the scraper blade unit into or out of contact with the ground and to hold the body in a loading, carrying, or dumping position. As shown for example in Figs. 1, 2, and 3, the yoke frame 24 comprises a transversely extending cylindrical portion 38 rigidly attached to a forwardly extending section 39 which terminates with an integral connection with the post 28. The outer ends of the portion 38 are integrally connected to rearwardly extending side arms 40 and 41 each pivotally attached at 42 to a rocker arm 43 which for the present may be considered as part of the main scraper frame 44.

A truss 45 comprising several structural members is supported on top of the frame 24 and terminates in a sheave block 46 in which are mounted sheaves 47. A second series of sheaves 48 are mounted on a bracket extending from the beam 16 forming part of the main frame 44. A hoist cable 50 having one end secured at 49 (Fig. 3) to the sheave block 46 is reeved over the series of sheaves 47 and 48 and thence passes over a sheave 51 supported from the forward portion of the frame 24, thence under a pulley 152 suitably mounted adjacent the lower end of the post 28, from which the cable 50 is extended to the usual power driven winch (not shown) provided on the tractor and under control of the tractor operator in a manner commonly employed. It will be seen from the above that drawing on the cable pulls the sheaves 47 and 48 together, rocking the yoke frame 24 about the pivot 42 and raising the main frame 44 about the rear wheels 21.

As shown, for example, in Figs. 2 and 3, the scraper body or frame 44 has incorporated therein a rear bowl 52 for supporting scraped material located behind the scraper blade. The bowl 52 is movable between the side walls 10 and 11 and is suitably secured to a transversely extending shaft 53. Hinged on the shaft 53 is a floor panel 54 extending across the scraper and also hinged on a second shaft 55 which is suitably and rigidly secured to the above mentioned bracket or plate 37 for the scraper blade. The panel 54 forms a continuous floor section between the bowl and the scraper blade to guide scraped material between the blade and the bowl in different rocked positions of the latter.

The bowl 52 is provided with lugs 55 extending outwardly from the end walls 56 thereof, which lugs normally rest on rollers 57 mounted on and extending inwardly from the previously mentioned rocker arms 43 (Fig. 1). The rocker arms are pivoted on coaxially extending pivot pins 58 on the side walls 10 and 11 and are normally held in the position illustrated in Figs. 1 and 3 by virtue of the weight of the bowl 52 which forces the rollers 57 upon lugs 59 extending inwardly from the side walls 10 and 11. The above construction permits the bowl 52 to be rocked about the rollers 57 as a pivotal support a limited amount between the two different positions illustrated in Fig. 3 for purposes which will appear hereinafter.

Means are provided for rocking the bowl 52 forwardly to any position from its full line position of Fig. 3 wherein a post 60 thereof normally rests against the transverse beam 14. For this purpose an operating cable 61 is attached at 62 to the sheave block 46 and is reeved about sheaves 64 mounted at the upper end of the post 60 and sheaves 65 mounted on the sheave block 46 above the hoist sheaves 47. The cable 61 then passes over a sheave coaxial with the sheave 51 and about a pulley 66 suitably mounted on the post 28 of the yoke frame 24, from whence it passes to a second winch (not shown) carried by the tractor and operable under the control of the tractor operator.

During the major portion of a loading operation the cable 61 is preferably intermittently operated to rock the bowl 52 between its two illustrated positions of Fig. 3 as will appear hereinafter while release of the cable will allow the bowl to return under the action of gravity to its rearmost position.

Located in front of the scraper blade unit 36 is an apron or front bowl 68 for supporting scraped material located in front of the scraper blade 36. This apron is adjustably supported within the side walls 10 and 11 to vary the size of the opening between the same and the blade so as to permit movement of the material scraped by the blade into the body, to prevent material from falling over the blade during carrying operations as well as to permit unloading and spreading of the scraped material. To this end the apron is provided with sides 68' integrally connected with arms 69 through box extensions 70 (see Fig. 2). The arms 69 are located on the outsides of the side walls 10 and 11 and are pivotally connected at their lower ends to links 71 which in turn are pivoted to the upper ends of the rocker arms 43. Also pivotally connected to the arms 69 are links 72 which are pivoted at their rear ends to the side walls 10 and 11. Each arm 69 is pivoted to a third link 73 having an elongated slot 74 embracing a guide pin 75 secured to the corresponding arm of the yoke frame 24. It will be noted that in view of the above mentioned non-parallel arrangement of the links 71 and 72, the apron 68 will be guided in a substantially arcuate path toward and away from the scraper blade upon movement of the link 73 while lengthwise movement of link 71 caused by rocking of arms 43 will likewise cause movement of the apron toward or away from the scraper blade. The position of the apron relative to the blade is controlled by several factors or combination of factors, i. e., the height of the scraper above the ground, the position of the bowl 52, the resistance to forward movement of the scraper caused by contact of the scraper blade with the ground, etc., as will appear hereinafter Means are provided to reduce the resistance to entry of the dirt or other scraped material into the scraper body. Pivoted at 80 to brackets extending from the sides 56 of the bowl 52 is a scouring plate 81 having rollers 82 mounted at the lower end thereof and adapted to guide the same along the upper surface of the floor panel 54 as the bowl is rocked.

As is well known in the scraper art, the scraped material is introduced upwardly into the scraper from the scraper blade and some of it falls forwardly or rearwardly of the opening over the blade while the remainder, braced by such forward and rearward piles of material extends substantially upwardly and, due to further influx of material, tends to pack and form a homogeneous mass or vertically extending strata above and slightly to the rear of the scraper blade. This is particularly true of certain materials and this packing of the material above the blade tends to clog the opening and prevent further influx of the material into the scraper. The scouring blade 81 reduces any such tendency in view of its location substantially along the center of any such normally possible packed strata. Since the blade 81 provides a smooth surface along which the packed material may be moved during the loading operation the resistance to upward movement of the material is reduced and the scraped material first moves into the apron 68 thereby falling forwardly. As the body of the material moves upwardly over the upper edge of the plate 81 a large portion thereof falls rearwardly into the main bowl 52. If desired, the plate 81 may be removed from the bowl 52, particularly when encountering certain types of material.

The automatic control of the apron 68 will now be described in connection with the different operations of the scraper. When the hoist cable 50 is released to lower the scraper into its loading position of Figs. 1 and 3, and the bowl 52 is allowed to remain anywhere between its two positions illustrated in Fig. 3, the pins 75 on the arms of the yoke frame 24 engage the upper ends of the slots 74 of links 73, forcing these links to rock the apron 68 to substantially the position illustrated in Fig. 3 wherein a partial opening is formed to permit material to be guided into the scraper body. It will be noted that in the absence of other adjustments, any variation in height of the scraper in loading will result in a proportionate variation in the size of the opening caused by the apron and that for deeper cuts a larger opening will be made. When the cable 50 is operated to raise the scraper the pins 75 recede from the tops of the slots 74 thereby permitting the apron to be closed if otherwise allowed to do so.

A further influence on the control of the position of the apron is obtainable from the reaction between the scraper blade or body and the yoke frame 24 caused by the scraper blade in digging into the ground. This is particularly useful in first starting to load the scraper. In this operation the bowl 52 is moved to a position somewhat in advance of its intermediate dot-and-dash line position 52' (Fig. 3) by pulling on the cable 61. As the bowl 52 moves forward about the rollers 57, the floor panel 54 is lowered and when the bowl reaches the dot-and-dash line position 52' the panel engages suitable stop lugs or brackets 100 and thus holds the shaft 53 stationary as a rigid pivotal axis for the bowl. Now, as the bowl is rocked somewhat forward of the intermediate position 52' it pivots about shaft 53 and therefore the lugs 55 are elevated, permitting the rocker arms 43 to be likewise rocked. As the scraper blade cuts into the ground, resistance to forward movement of the scraper is set up and by virtue of the pull of the tractor or other draft device on the tongue 152 and yoke frame 24, the rocker arms 43 are rocked toward the front of the scraper and about the pins 58 by an amount controlled by the position of the bowl 52. This movement is transmitted through the links 71 and thus rocks the apron 68 outwardly away from the blade. It will be noted from the above that the size of the opening formed by the apron 68, beyond that effected by the pins 75 on the yoke frame 24, may be controlled by controlling the position of the bowl 52 somewhat forwardly of its position 52'. After the scraper is at least partially loaded the bowl 52 may preferably be permitted to return to its full line position of Fig. 3 or some other position intermediate its two illustrated positions of that figure, relying on the pins 75 of the yoke frame to control the position of the apron, except under certain conditions where it may be desirable to increase the size of the opening for a given elevation of the scraper body.

During the loading operation it is intended that the bowl 52 be intermittently rocked back and forth between its alternate positions of Fig. 3 to distribute the scraped material uniformly throughout the scraper body. That is, the bowl is first allowed to assume its full line position of Fig. 3 until the scraped material is piled up directly above the scraper blade. Thereafter the cable 61 is operated drawing the bowl 52 forwardly toward its alternate position 52' so as to exert a squeezing action on the scraped material which tends to shift the same toward the rear end of the bowl and the forward end of the apron. On release of the cable 61 the bowl again assumes its full line position under the action of gravity resulting in the pile directly above the blade being reduced. Also this particular action tends to aid the plate 81 to break up any tendency for the scraped material to pack directly above the scraper blade. The above procedure of distributing material scraped throughout the body is somewhat similar to that disclosed in detail in my copending application Serial Number 338,908, filed June fifth, 1940, and since matured into Patent Number 2,301,158, issued on November third, 1942.

Figure 4:
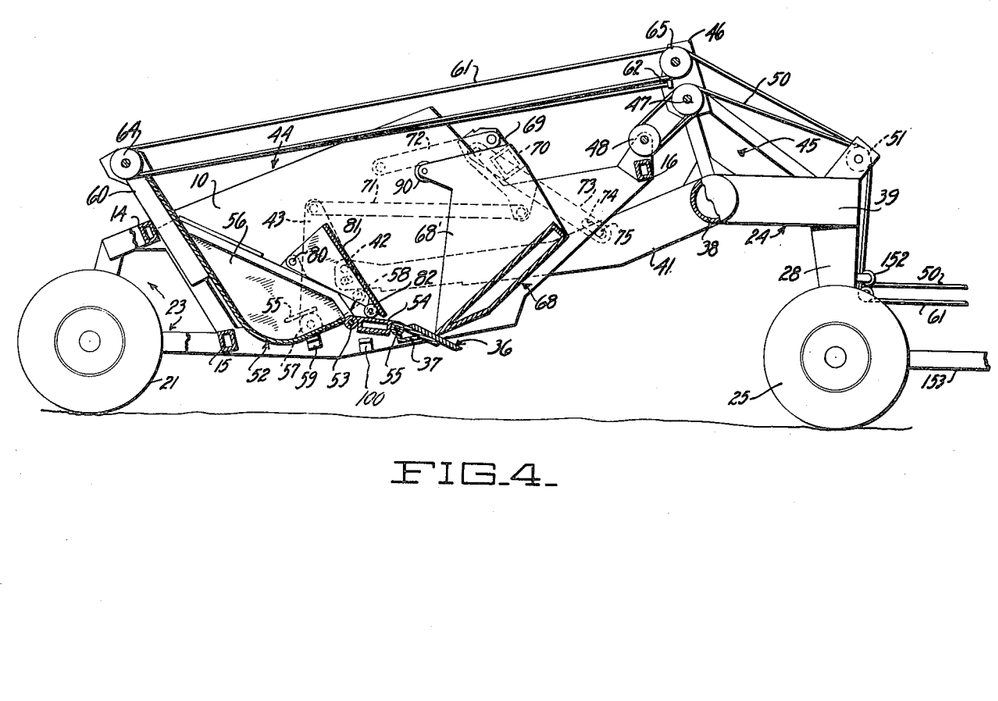
Fig. 4 is a longitudinal sectional view of the scraper illustrating the same in carrying position.

When the scraper has received a capacity load, or before if desired, the hoist cable 50 is operated to raise the scraper body upwardly to substantially the position illustrated in Fig. 4, while the cable 61 is released to permit the bowl 52 to move to its rearward position or at least to its alternate position 52' of Fig. 3. As the body is raised the pins 75 on the arms of the yoke frame drop with respect to the top of the slot 74 in link 73 to enable the apron to be closed. Although the closing action of the apron may be opposed by the material within the body, upward movement of the sheaves 48 in raising the body will, by virtue of the pivotal connection 42 between the body or main frame 44 and the forward or yoke frame 24, position the sheaves 48 rearward with respect to the sheaves 47. Therefore, the cable 50 extending between the sheaves 47 and 48 will impart a component of force tending to cause a rearward movement of the yoke frame relative to the scraper body. This force is transmitted to the rocker arms 43 to force these arms counter-clockwise and thereby draw the links 71 rearward to close the apron.

The unloading action of the scraper is as follows. When the scraper has been moved to a location where it is desired to unload the scraped material the hoist cable is retained taut in the position illustrated in Fig. 4 or somewhat lower as shown, for example, in Fig. 5, and the cable 61 is pulled forwardly forcing the bowl 52 to move in the manner previously described in connection with loading. As the bowl moves forward it forces the scraped material forwardly also and, as the bowl passes its intermediate position, similar to that illustrated at 52' in Fig. 3, it removes its holding influence on the rocker arms 43 and thence causes the material to force the apron 68 open to permit ejection. During the forward movement of the bowl the rollers 82 guide the plate 81 forwardly along the floor panel 54 and thereby push the material in front thereof forwardly.

During the unloading operation the material is spread on the ground in a layer the thickness of which is determined by the heighth of the scraper body or blade above the ground.

Figure 5:
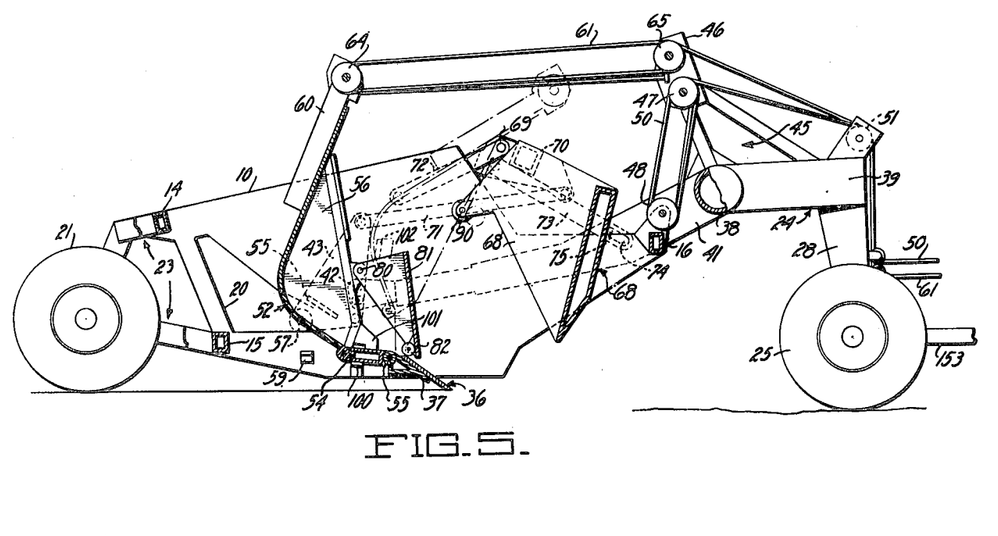
Fig. 5 is a longitudinal sectional view of the scraper illustrating the same in unloading position.

As the bowl reaches the position illustrated in full lines of Fig. 5, during its forward movement in unloading, feet 101 formed thereon engage the floor panel 54 and thereafter cause both the bowl and the floor panel to rock about the shaft 55. The size of the opening formed by the apron 68 at this time will depend on the type of material or dirt unloaded and upon the speed at which the bowl 52 is rocked while the rocker arms 43 will be prevented from being rocked clockwise beyond a certain point by stops 102 (see also Fig. 1) mounted on the side beams 17.

During the major portion of the forward movement of bowl 52 the apron 68 will be moved just sufficiently to permit discharging of the material over the scraper blade. However, toward the end of the forward movement of the bowl 52 the forward edges of the sides 56 thereof will engage rollers 90 mounted on the sides 68' of the apron 68 and thus force the apron into a maximum upper position. This engagement is caused somewhat abruptly and thus tends to shake any clinging material from the surface of the apron 68 as well as from the bowl 52. Also during the forward movement of the bowl 52 the scouring plate 81 will either be guided over the panel 54 by the rollers 82 or will hinge freely on the pivots 80 being rocked by the material as it moves through the scraper. As the sides 56 of the bowl 52 engage the rollers 90 and rock the apron 68 to an extreme open position they thereafter ride over these rollers bringing the bowl and panel 54 substantially into the position illustrated in dotted lines in Fig. 5. Upon release of the cable 61 the apron 68 by virtue of its weight, aids in returning the bowl toward its normal rearward position.

Figure 7:
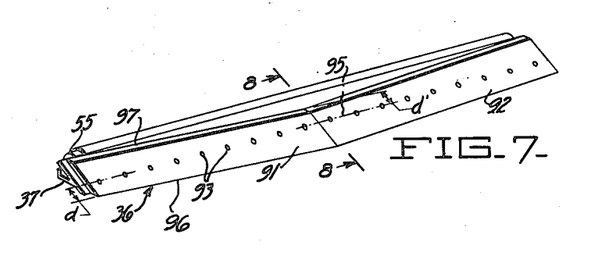
Fig. 7 is a perspective view of the scraper blade unit.
Figure 8:
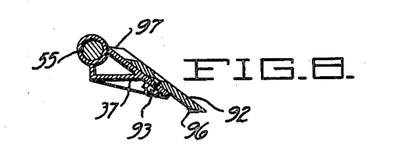
Fig. 8 is a transverse sectional view of the scraper blade unit and is taken along the line 8—8 of Fig. 7.

Referring in particular to Figs. 7 and 8, the scraper blade unit 36 is formed in two sections 91 and 92 each secured by a series of bolts 93 to the upper flat supporting surface of the inclined brace plate 37 which is suitably secured to the side walls 10 and 11 of the scraper body. These sections 91 and 92 are identical with each other and are arranged on the plate 37 to diverge upwardly from their juxtaposed ends and thus form, both in plan and in front elevation, a plow-type scraping edge which diverges rearwardly and upwardly from a central apex to operate much easier than the conventional form of scraper blade having a continuous straight cutting edge, particularly when encountering hard packed material. This particular arrangement permits the scraping or cutting edge as the scraper body is being lowered during forward movement of the scraper, to begin cutting with a point contact and to gradually increase the effective or working length of the edge as it is lowered into the material. It will be noted that the row of bolts 93 extends along a continuous straight horizontal line 95 which is parallel to the bottom and top edges of the plate 37 but inclined relative to the parallel edges of each of the sections 91 and 92. Both of these edges as at 96 and 97 are beveled to form cutting edges and although only the lower edges 96 form an operative cutting edge when the sections 91 and 92 are attached to the plate 37 as illustrated, the upper edges 97 may be utilized as cutting edges in the event the lower ones become worn by first turning each section upside down and then placing the right hand section 92 (as viewed in Fig. 7) on the left hand side of the plate 37 and placing the left hand section 91 on the right hand side. It will be noted that the distance $d$ between the center line 95 of the row of holes and the cutting edge 96 on one end of each section is equal to the distance $d'$ between the line 95 and the cutting edge 97 on the opposite end of each section. Therefore, in either arrangement of the sections 91 and 92 the same plow type of formation will result as appears in Fig. 7. In view of the two piece construction of the blade unit the two sections, because of their straight edges, are easily sharpened.

Referring to Fig. 1, a second bearing hole 420 is located at the rear of each arm of the yoke frame 24, directly below the previously mentioned pivot pin 42. These bearing holes 420 are coextensive with similar bearing holes in the rocker arms 43 whereby the pins 42 may, if desired, be transferred to these lower bearing holes so that the force required to cause the yoke frame 24 to rock the arms 43 to perform the various hereinabove described functions may be increased.

Having thus described the invention, what I desire to secure by Letters Patent is:

1. Scraping apparatus comprising the combination with a scraper body, and means supporting said body for movement along the ground; of a closure member capable of closing one end of said body, means supporting said member for movement toward and away from closing position, means including a draft member for transmitting movement to said body to move the same along the ground, said last mentioned means being capable of limited movement relative to said body in the line of draft, and means responsive to such relative movement for moving said member from closing position.

2. Scraping apparatus comprising the combination with a scraper body, a scraper blade associated in operative relationship therewith, and means supporting said body for movement along the ground; of a member in juxtaposition with said blade and adapted to form an opening therebetween to permit the passage of material scraped by said blade into said body, means supporting said member for movement toward and away from said blade, means including a draft member for transmitting movement to said body to move the same along the ground, said last mentioned means being capable of limited movement relative to said body in the line of draft, and means responsive to said relative movement for causing said opening forming member to vary the size of said opening.

3. Scraping apparatus comprising the combination with a scraper body, a scraper blade associated in operative relation therewith, and means for supporting said body for movement along the ground; of a member in juxtaposition with said blade and adapted to form an opening therebetween to permit the passage of material scraped by said blade into said body, means supporting said member for movement toward and away from said blade, means including a draft member for transmitting movement to said body to move the same along the ground, said last mentioned means being capable of limited movement relative to said body in the line of draft, means responsive to said relative movement for causing said opening forming member to vary the size of said opening, and means for enabling and disabling said last mentioned means.

4. Scraping apparatus comprising the combination with a scraper body, a scraper blade associated in operative relation therewith, and means supporting said body for movement along the ground; of a member in juxtaposition with said blade and adapted to form an opening therebetween to permit the passage of material scraped by said blade into said body, means supporting said member for movement toward and away from said blade, means including a draft member for transmitting movement to said body to move the same along the ground, and means responsive to the reaction between said last mentioned means and said blade upon scraping the ground for causing said opening forming member to vary the size of said opening.

5. Scraping apparatus comprising the combination with a scraper body, a scraper blade associated in operative relationship therewith, and means supporting said body for movement along the ground; of a member in juxtaposition with said blade and adapted to form an opening therebetween to permit the passage of material scraped by said blade into said body, means supporting said member for movement toward and away from said blade, means including a draft member for transmitting movement to said body to move the same along the ground, means responsive to the reaction between said last mentioned means and said blade upon scraping the ground for causing said opening forming member to vary the size of said opening, and means for enabling and disabling said last mentioned means.

6. Scraping apparatus comprising the combination with a scraper body, a scraper blade associated in operative relationship therewith; of means comprising a frame for supporting said body for movement along the ground, said frame being capable of limited movement relative to said body in the line of draft, a member in juxtaposition with said blade and adapted to form an opening therebetween to permit the passage of material scraped by said blade into said body, means supporting said member for movement toward and away from said blade, means for transmitting movement to said frame to move said body along the ground, and means responsive to said relative movement for causing said opening forming member to vary the size of said opening.

7. Scraping apparatus comprising the combination with a scraper body, a scraper blade associated in operative relationship therewith; of means comprising a frame for supporting said body for movement along the ground, said frame being capable of limited movement relative to said body in the line of draft, a member in juxtaposition with said blade and adapted to form an opening therebetween to permit the passage of material scraped by said blade into said body, means supporting said member for movement toward and away from said blade, means for transmitting movement to said frame to move said body along the ground, and means responsive to said relative movement upon scraping the ground by said blade for causing said opening forming member to enlarge the size of said opening.

8. Scraping apparatus comprising the combination of a scraper body, a scraper blade associated in operative relationship therewith; of means comprising a frame for supporting said body for movement along the ground, said means being capable of limited movement relative to said body in the line of draft, a member in juxtaposition with said blade and adapted to form an opening therebetween to permit the passage of material scraped by said blade into said body, means supporting said member for movement toward and way from said blade, means for transmitting movement to said frame to move said body along the ground, means responsive to said relative movement for causing said opening forming member to vary the size of said opening, and means operable independently of said last mentioned means for causing said member to vary the size of said opening.

9. Scraping apparatus comprising the combination with a scraper body, and means supporting said body for movement along the ground; of a closure member capable of closing one end of said body, means supporting said member for movement toward and away from closing position, means including a draft member for transmitting movement to said body to move said frame along the ground, said last mentioned means being capable of limited movement relative to said body in the line of draft, means responsive to said relative movement for moving said member from closing position, means for enabling and disabling said moving means, and means operable independently of said moving means for causing said member to vary the size of said opening.

10. Scraping apparatus comprising the combination with a scraper body, and a scraper blade associated in operative relationship therewith; of means comprising a frame for adjustably supporting said body for movement along the ground; a member in juxtaposition with said blade and adapted to form an opening therebetween to permit the passage of material scraped by said blade into said body, means supporting said member for movement toward and away from said blade, means including a draft member for transmitting movement to said frame to move said body along the ground, said frame being capable of limited movement relative to said body in the line of draft, means responsive to said relative movement for causing said opening forming member to vary the size of said opening, hoist means for adjusting said body toward and away from the ground, and means responsive to operation of said hoist means upon adjusting said body for causing said opening forming member to vary the size of said opening.

11. Scraping apparatus comprising the combination with a scraper body, and a scraper blade associated in operative relationship therewith; of means comprising a frame for adjustably supporting said body for movement along the ground; a member in juxtaposition with said blade and adapted to form an opening therebetween to permit the passage of material scraped by said blade into said body, means supporting said member for movement toward and away from said blade, means including a draft member for transmitting movement to said frame to move said body along the ground, said frame being capable of limited movement relative to said body in the line of draft, means operable by said frame upon said movement thereof relative to said body for causing said opening forming member to vary the size of said opening, hoist means connecting said body to said frame for adjusting said body toward and away from the ground, and means operable by said frame upon operation of said hoist means for causing said opening forming member to vary the size of said opening.

12. Scraping apparatus comprising the combination with a scraper body, a scraper blade associated in operative relationship therewith; of means comprising a frame for adjustably supporting said body for movement along the ground; an apron in juxtaposition with said blade and adapted to form an opening therebetween to permit the passage of material scraped by said blade into said body, means supporting said apron for movement toward and away from said blade, means for transmitting a draft movement to said frame to move said body along the ground, means responsive to application of such draft movement to said last mentioned means for moving said apron away from said blade, hoist means between said body and said frame for moving said body away from the ground, and means operable by said hoist means upon moving said body away from the ground for moving said apron toward said blade.

13. Scraping apparatus comprising the combination with a scraper body, and means supporting said body for movement along the ground; of a closure member capable of closing one end of said body, means supporting said member for movement toward and away from closing position, means including a draft member for transmitting movement to said body to move the frame along the ground, said last mentioned means being capable of limited movement relative to said body in the line of draft, means responsive to said relative movement for moving said member from closing position, a bowl, means supporting said bowl in said body for movement into different positions, and means controlled by said bowl in different positions thereof for enabling and disabling said member moving means.

14. Scraping apparatus comprising the combination with a scraper body, and a scraper blade associated in operative relationship therewith; of an apron in juxtaposition with said blade and adapted to form an opening therebetween to permit the passage of material scraped by said blade into said body, means supporting said apron for movement toward and away from said blade, a member operatively connected to said body and capable of limited movement relative thereto, means comprising a frame operatively connected to said member for supporting said body, means for transmitting a draft movement to said member to move said body along the ground, and an operative connection between said member and said apron for transmitting movement to said apron upon transmission of a draft movement from said frame to said member.

15. Scraping apparatus comprising a scraper body, means supporting said body for movement along the ground, a pair of receptacles supported by said body, a scraper blade associated in operative relationship with said body and said receptacles to direct material scraped thereby upwardly into said body and into said receptacles, said directed material being subject to compacting into a dense stratum above said blade, means for moving one of said receptacles toward and away from the other whereby to force said directed material scraped by said blade more completely into said receptacles, a guide member rockably supported adjacent the upper end thereof by said movable receptacle and extending downwardly substantially along the center of a region subject to said compacting of said material to a point adjacent said blade, and means for guiding said member adjacent the lower end thereof toward said other receptacle during movement of said movable receptacle toward said other receptacle.

16. Scraping apparatus comprising the combination with a scraper body, and means for supporting said body for movement along the ground; of a pair of receptacles supported by said body, a scraper blade associated in operative relationship with said body and said receptacles to direct material scraped thereby upwardly into said body and into said receptacles, said directed material being subject to compacting into a dense stratum above said blade, means for rocking one of said receptacles about an axis adjacent the lower end thereof and toward and away from the other whereby to force said directed material scraped by said blade more completely into said receptacles, a guide member rockably supported adjacent the upper end thereof by said rockable receptacle and extending downwardly through a region subject to compacting of said material to a point adjacent said blade, and means for guiding said member adjacent the lower end thereof toward said other receptacle during rocking of said rockable receptacle.

17. Scraping apparatus comprising the combination with a scraper body, a scraper blade associated in operative relation therewith, means comprising a frame for adjustably supporting said body for movement along the ground, and hoist means connecting said body to said frame for adjusting said body toward and away from the ground; of a receptacle adapted to receive material scraped by said blade, means supporting said receptacle for movement relative to said body, means including a draft member for transmitting movement to said frame to move said body along the ground, said frame being capable of limited movement relative to said body in the line of draft; and means operable by said frame upon said movement thereof relative to said body for moving said receptacle.

GORDON E. DANIELS.